US006968477B2

(12) United States Patent
Mehta et al.

(10) Patent No.: US 6,968,477 B2
(45) Date of Patent: Nov. 22, 2005

(54) SYSTEM AND METHOD FOR SYSTEM SURVEILLANCE USING FIRMWARE PROGRESS CODE

(75) Inventors: Chetan Mehta, Austin, TX (US); Jayeshkumar M. Patel, Austin, TX (US); Manesh Patel, Austin, TX (US); David Lee Randall, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 679 days.

(21) Appl. No.: 10/093,434

(22) Filed: Mar. 7, 2002

(65) Prior Publication Data

US 2003/0172320 A1 Sep. 11, 2003

(51) Int. Cl.[7] ............................................. G06F 11/00
(52) U.S. Cl. ........................... 714/31; 714/36; 714/48; 710/10; 713/1; 713/2; 713/502
(58) Field of Search .............................. 714/31, 36, 48; 710/10; 713/1, 2, 502

(56) References Cited

U.S. PATENT DOCUMENTS

| | | | | |
|---|---|---|---|---|
| 5,440,726 A | * | 8/1995 | Fuchs et al. .................. | 714/20 |
| 5,535,330 A | * | 7/1996 | Bell ............................. | 714/36 |
| 6,507,906 B1 | * | 1/2003 | Criddle et al. ................. | 713/2 |
| 6,530,031 B1 | * | 3/2003 | Randall et al. ............. | 713/502 |
| 6,550,019 B1 | * | 4/2003 | Ahrens et al. ................ | 714/10 |
| 6,564,348 B1 | * | 5/2003 | Barenys et al. ............. | 714/732 |
| 6,715,106 B1 | * | 3/2004 | Mermelstein ................ | 714/36 |
| 6,751,569 B2 | * | 6/2004 | Merkin et al. .............. | 702/120 |
| 6,826,707 B1 | * | 11/2004 | Stevens ........................ | 714/2 |

OTHER PUBLICATIONS

Microsoft Dictionary 4th ed, 1999,Microsoft Press, pp. 372.*

* cited by examiner

*Primary Examiner*—Robert Beausoliel
*Assistant Examiner*—Emerson Puente
(74) *Attorney, Agent, or Firm*—Van Leeuwen & Van Leeuwen; Joseph T. Van Leeuwen; Mark E. McBurney (57) ABSTRACT

A system and method for monitoring a host computer using a service processor is provided. A shared nonvolatile random access memory (NVRAM) area is used to store progress information from the host computer system. The host computer system writes progress information corresponding to the initialization step being performed to the shared NVRAM and also updates a host pointer in the NVRAM. The service processor reads the shared NVRAM and compares its pointer with the host pointer to determine whether new host initialization activity has been reported. The service processor sets a timer so that if host activity is not reported during a set amount of time an error condition occurs causing the service processor to handle the host computer error. An optional service processor routine determines whether the host computer is stuck in an initialization loop whereupon the service processor once again handles the host computer error.

17 Claims, 5 Drawing Sheets

SYSTEM AND METHOD FOR SYSTEM SURVEILLANCE USING FIRMWARE PROGRESS CODE

BACKGROUND OF THE INVENTION

1. Technical Field

The present invention relates in general to a system and method for monitoring computer system initialization. More particularly, the present invention relates to a system and method for monitoring system initialization using a service processor that monitors initialization progress codes.

2. Description of the Related Art

Computer systems perform a variety of functions during initialization. Computer systems vary greatly in terms of initialization needs. One system may have a variety of peripheral devices that need to be initialized, while another system has fewer devices. Some computer systems include a service processor for performing and monitoring system initialization. For example, the IBM Model 6M1 has an integrated enhanced service processor, located in the primary I/O drawer. When the system is powered down, but still plugged into an active power source, the service processor functions are still active under standby power. This function provides enhanced Reliability, Availability, and Serviceablity (RAS) by not requiring an operating system (e.g., IBM's AIX™ operating system) to be operational for interfacing with a system administrator or service director for the computer system, such as the IBM RS/6000™. Service processor menu functions (using the local, remote, or terminal concentrator console), as well as dial out capability, are available even if the system is powered down or unable to power up.

The service processor can provide for a computer system to automatically reboot (if the appropriate policy flags are set) in certain conditions. These conditions include when power is restored after a power loss during normal system operation, when hardware checkstop failures occur, when machine check interrupt conditions occur, and when the operating system hangs (Surveillance Failure) or fails.

In the prior art, the service processor performs surveillance of system initialization through a heartbeat mechanism that sends mailbox commands periodically to the service processor. If there is no interrupt driven heartbeat (e.g., using a mailbox command) received within the time-out period, the service processor takes appropriate action. Actions that the service processor may take include creating a system reset to allow a system dump to occur, capturing scan debug data for the system, and rebooting the system.

One challenge facing traditional service processor periodic heartbeat mechanisms is that some system initialization steps, such as I/O initialization, take longer to perform. This may cause the interrupt driven heartbeats to be delayed causing the service processor to erroneously determine that an initialization error occurred. A challenge facing traditional interrupt driven heartbeat mechanisms is that error conditions wherein an endless loop occurs during initialization may not be detected as an error by the service processor. This condition occurs when interrupt driven heartbeats continue to be generated during the loop, indicating to the service processor that initialization is still taking place.

What is needed, therefore, is a system and method in which the progress of the system initialization is communicated to the service processor without relying upon interrupt driven heartbeats.

SUMMARY

It has been discovered that the aforementioned challenges are overcome by utilizing a shared memory area to which the host initialization process writes progress codes and from which the service processor monitors system initialization. In one embodiment, the shared memory includes nonvolatile random access memory (NVRAM) that is used to store progress codes in an NVRAM buffer area. In addition, the NVRAM includes pointers for both the host and service processor so that each can determine where the last progress codes were written/read.

The host processing initializes a host pointer in the NVRAM upon startup. When various host initialization processes are performed a progress code corresponding to the process is written to the NVRAM buffer area and the host pointer is updated accordingly. Progress codes continue to be written to the NVRAM until initialization is finished, at which time the service processor is informed that initialization is complete.

Simultaneously performed with host processing, the service processor monitors the host initialization progress. Upon startup, the service processor initializes its pointer in the NVRAM indicating that it has not yet processed any progress codes from the host. The service processor sets a timer corresponding to a time out value. After the timer is initialized, the service processor repeatedly checks the host pointer and compares it to the service processor pointer. This repeated checking continues until either the timer expires or the pointers are no longer equal. Pointers no longer being equal indicates that a new progress code has been written by the host, whereupon the service processor handles the progress code, resets the timer, and waits for the next progress code or the timer to expire. If the timer expires, a host error is noted and appropriate action (e.g., reboot host, shutdown host, etc.) is performed.

In a further embodiment, a check is made as to whether the same progress code is repeatedly written to the NVRAM indicating that the host is stuck in an endless loop. When this condition occurs, the service processor also notes that a host error occurred and takes appropriate action.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
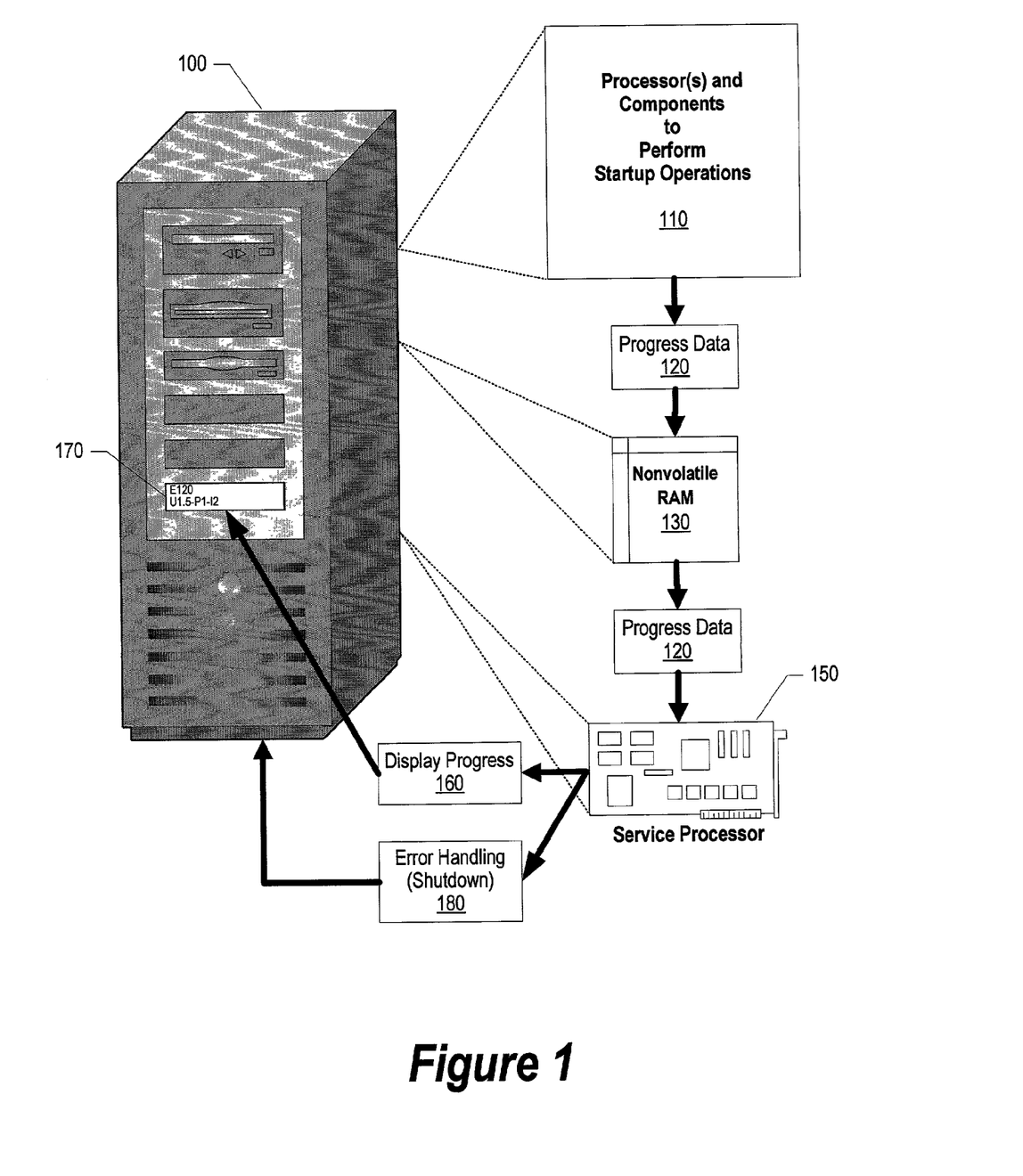
FIG. 1 is a high level diagram of host components and the service processor interacting using nonvolatile random access memory (NVRAM)

FIG. 1 is a high level diagram of host components and the service processor interacting using nonvolatile random access memory (NVRAM). Computer system 100 includes various components that are initialized during system startup. Processors and other components 110 are initialized using startup routines included in the boot sequence of the service processor, system firmware and operating system (e.g., IBM's AIX™). As various components are initialized, the host microcode writes progress data 120 to nonvolatile random access memory (NVRAM 130) that is accessible from the host operating environment. In the embodiments described herein, nonvolatile RAM is used to store and read progress data. However, as will be appreciated by those skilled in the art, other shared storage means, such as nonvolatile storage devices (i.e., disk storage) and other types of memory could be used to communicate progress data from the host computer system to the service processor.

Service processor 150 is included in computer system 100 for hardware initialization & system monitoring. Service processor 150 reads progress data 120 from NVRAM 130. Display progress routine 160 is used by service processor 150 to display the current initialization progress data on operator display panel 170 included with the computer system. The service process continues to retrieve progress data from NVRAM 130 and display the progress data on operator display panel 170. In one implementation the Service Processor is the sole component writing to operator display panel 170.

Service processor 150 also monitors the amount of time since the last progress data was written to NVRAM 150 by host processor(s) 110. If too much time occurs (i.e., a time out condition), service processor responds by signaling an error condition and performs error handling routine 180 to perform appropriate system recovery actions (i.e., reboot computer system 100, shutdown computer system 100, etc.).

Figure 2:
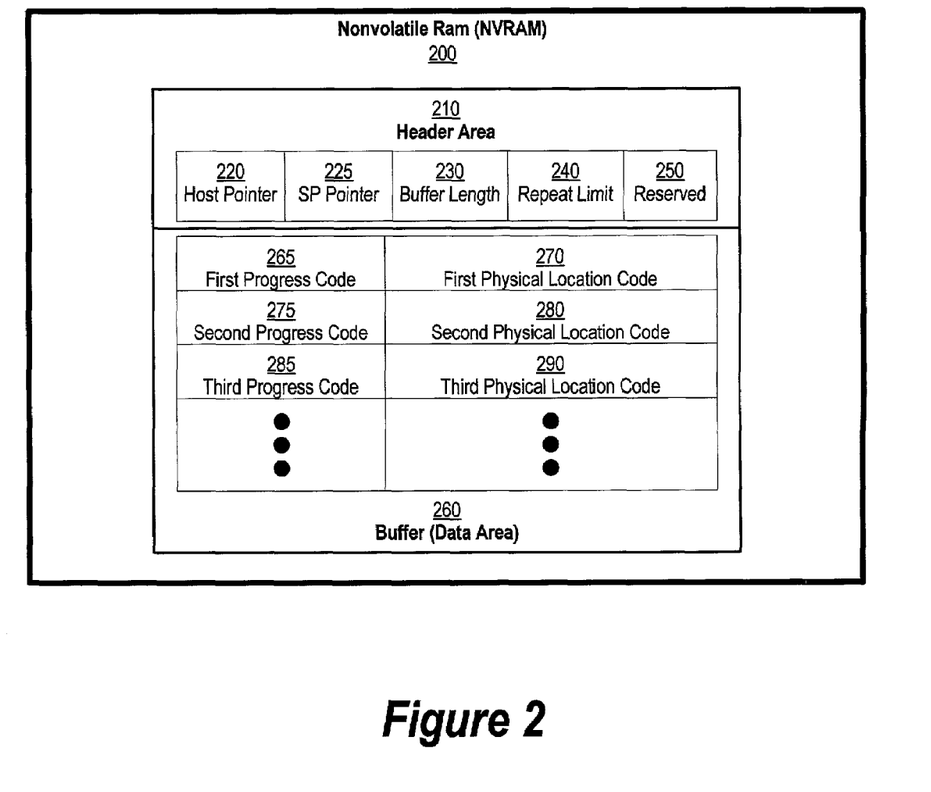
FIG. 2 shows a diagram of a layout of the NVRAM used to provide system surveillance.

FIG. 2 shows a diagram of a layout of the nonvolatile random access memory (NVRAM) used to provide system surveillance. NVRAM 200 includes header area 210 and buffer, or data, area 260. Header area 210 includes host pointer 220, service processor pointer 225, buffer length 230, optional repeat limit 240, and reserved area 250.

Host pointer 220 is a pointer corresponding to the next location in buffer 260 to be written by the host initialization processes. Similarly, service processor pointer 225 is a pointer corresponding to the next location in buffer 260 to be read by the service processor. One indication that progress codes have been written to buffer 260 is when the host pointer and the service processor pointer do not point to the same memory address. However, if the host and service processor pointers point to the same memory address for an excessive period, a time-out condition occurs indicating that host processing is stuck or stalled and error processing commences. Error processing is initiated by the service processor and can include steps, such as rebooting the host computer system or shutting down the host computer system.

Buffer length 230 is a size, in bytes, of the length of buffer area 260. In one embodiment, buffer area 260 is cycled so that when the end of the buffer is reached data is written to the top of the buffer and the buffer space is recycled. Buffer length 230 is used to determine the location of the end of the buffer so that when the buffer is filled new data is written to the top of the buffer.

In one embodiment, repeat limit 240 is an optional value that determines the number of times a given progress code can be repeatedly written to buffer area 260 before an error condition occurs. In some embodiments, initialization steps may loop so that the same progress codes are repeatedly written. For example, if a common initialization code is used to initialize eight I/O ports then a progress code corresponding to the repeated initialization routine may repeat eight times. If the initialization routine becomes stuck in an infinite loop, an error condition may exist in the host but, because progress codes continue to be written to buffer 260 within the allotted time limit, an error condition might not normally be detected. Using repeat limit 240, a value, such as 50, may be used with the example situation described above. Now, when the same progress code is repeatedly encountered 50 times an error condition occurs and error processing is initiated by the service processor. Error processing can include steps, such as rebooting the host computer system or shutting down the host computer system. In addition, the progress code and error condition can be written to a computer operator display panel (see 170 in FIG. 1) to notify the operator so the initialization routine causing the error can be analyzed and repaired.

Reserved area 250 includes additional header information that may be needed for particular implementations. In addition in fixed length slot environments, described below, reserved area 250 may be used to store the length of the given slots (i.e., how many bytes used to store progress codes and how many bytes used to store physical location codes). In a variable length progress code environment, reserved area 250 may be used to store the termination character used between progress code entries in the buffer area (e.g., a form feed character (0x0C)). Reserved area 250 may also be used to store a time-out limit that identifies how much time must elapse for a time-out error condition to occur. In this manner, the amount of time may be altered depending on particular system initialization needs.

Buffer area 260 stores progress code and, in one embodiment, physical location codes that correspond to the progress code. In some environments, progress codes and physical location codes may be a fixed size, for example 16 bytes for the progress code and 48 bytes for the physical location code. In fixed-size environments, the buffer area can be divided into fixed length slots, or fields, used to store the progress codes and physical location codes. In the example provided above, the fixed length slots would be 64 bytes long with each slot storing information corresponding to one progress code. If the buffer length is 640 bytes long then the buffer area can store data pertaining to 10 progress codes before the buffer is filled and writing begins again at the top of the buffer. Host pointer 220 and service processor pointer 225 in a fixed length slot environments simply increment a fixed value (e.g., increment 64 every time a new progress code is written/read).

In another embodiment, the progress codes and physical location codes are variable length fields. In this embodiment, a termination character, such as a form feed character (0x0C) is used to separate one progress code entry from the next. When the host process is finished writing progress code information to the buffer area, the termination character is written. Likewise, when the service processor reads the progress code information, it starts reading at the pointer value (i.e., 0x00for the first read) and stops reading when the termination character is read.

In the example shown in FIG. 2, progress codes 265, 275, and 285 have been written to the buffer area. In some embodiments, physical location codes (270, 280, and 290) are also provided and written to the buffer area along with the progress codes. For example, the physical location code may provide data identifying the hardware drawer within the computer system, the planar within the drawer, and the adapter slot location within the planar. In this way, the initialization routine as well as a hardware location can be determined by data in the buffer area. This data can be displayed on the operator display panel in the computer system (see 170 in FIG. 1 for an example) so that a particular adapter can be identified and repaired/replaced in the event of a failure. The progress code qualified by a physical location code can be used as the value to determine whether the host is stuck in a loop in order to prevent erroneous error detections. For example, in some computer systems there are many adapters. If the same initialization routine and progress code are used to initialize each of the adapters, the system may appear to be stuck in an infinite loop (i.e., from the example above after 50 cards have been processed). However, using the progress code qualified by the physical location code reveals that while the same initialization routine and progress code are being used repeatedly, the initialization is not stuck as it is processing different physical locations.

Figure 3:
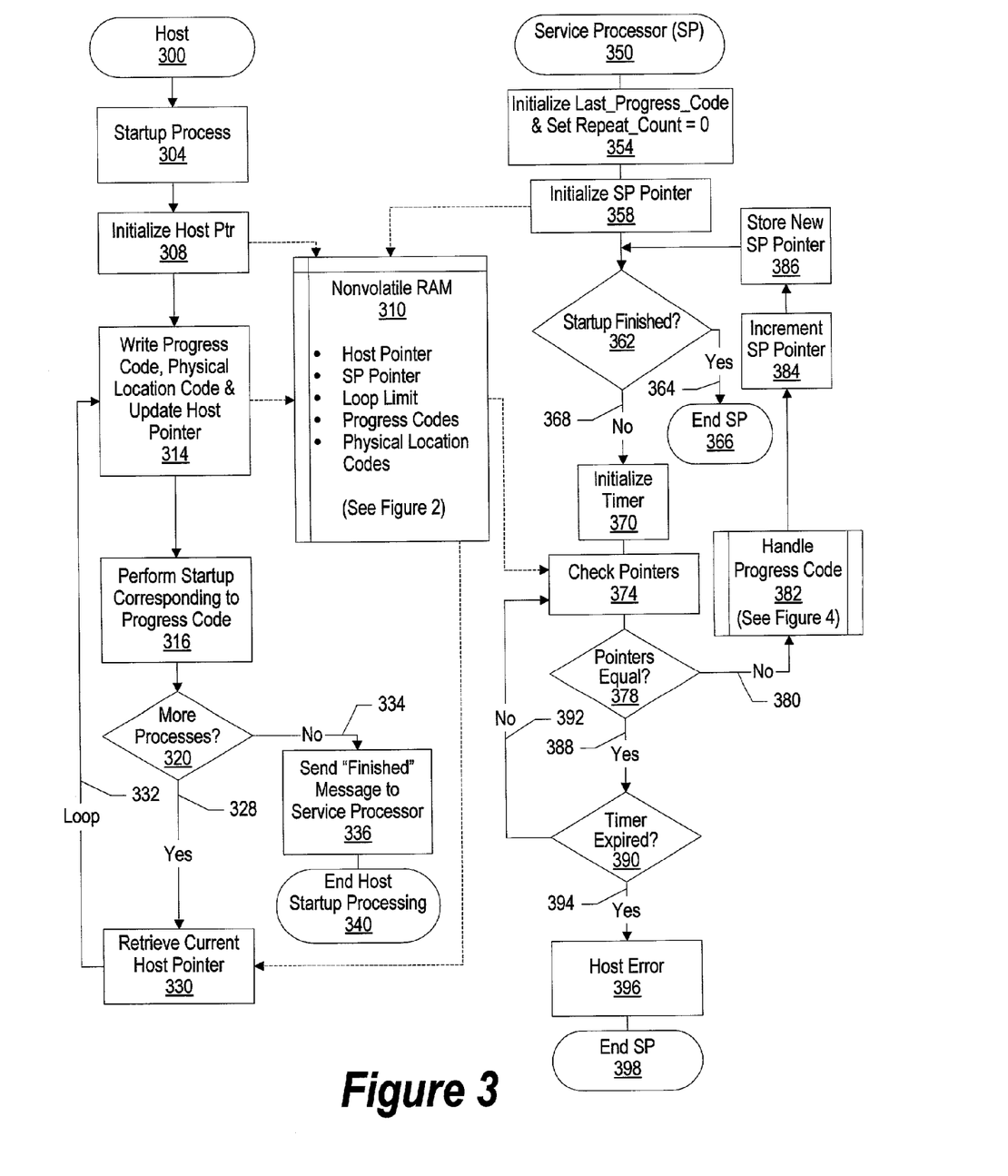
FIG. 3 is a flowchart showing host and service processor processing of progress codes through the NVRAM.

FIG. 3 is a flowchart showing host and service processor processing of progress codes through the NVRAM. Host processing commences at 300 whereupon the host startup, or boot, processing commences at 304. Service processor processing commences at 350 and runs concurrent with host processing.

Host processing initializes (step 308) the host pointer stored in nonvolatile RAM 310 (see FIG. 2 for a more detailed description of the nonvolatile RAM). The host pointer is initialized to zero (0x00) indicating that the first progress code will be written to the top of the nonvolatile RAM buffer. As host startup processing continues, the progress code, physical location code, and the incremented host pointer value corresponding to the first initialization process are written (step 314) to nonvolatile RAM 310. The initialization process corresponding to the first progress code and physical location code are performed by the host (step 316).

A determination is made as to whether there are more initialization processes to perform (decision 320). If there are more initialization processes to perform, decision 320 branches to "yes" branch 328 whereupon the current host pointer is retrieved from nonvolatile RAM (step 330) and processing loops back (loop 332) to write the new progress code and physical location code corresponding to the next process to the nonvolatile RAM and update the host pointer. This looping continues until there are no more initialization processes to perform, at which time decision 320 branches to "no" branch 334 whereupon a message is sent to the service processor (step 336) indicating that initialization is complete and host processing initialization ends at 340. In one embodiment, a hardware interrupt is used to notify the service processor that initialization is complete. In another embodiment, a special "finished" progress code is written to nonvolatile RAM that is read and processed by the service processor accordingly.

Turning to service processor processing, the service processor initializes a last_progress_code variable (step 354). In one embodiment where progress codes that are repeated numerous times indicate an error, a repeat_count variable is initialized to zero (step 354). The service processor pointer is initialized to zero and written (step 358) to nonvolatile RAM 310.

A determination is made as to whether an "initialization finished" message has been received from the host (decision 362). "No" branch 368 is repeatedly taken to monitor host initialization until the "initialization finished" is received from the host. When the "initialization finished" message is received, decision 362 branches to "yes" branch 364 and service processor host initialization monitoring ends at 366. In one embodiment the "initialization finished" message is sent to the service processor through a hardware interrupt, whereas in another embodiment, the "initialization finished" message is sent by the host through nonvolatile RAM 310, such as a special progress code. When this special progress code is encountered, the service processor branches to "yes" branch 364.

If the "initialization finished" message has not been received, decision 362 branches to "no" branch 368 whereupon a timer is initialized (step 370). In one embodiment the time-out value is initially retrieved from nonvolatile RAM 310, while in another embodiment the timeout value is set as a constant in the service processor.

The host pointer and service processor pointers stored in nonvolatile RAM 310 are read (step 374). A determination is made as to whether the pointers are the same value (decision 378). Pointers with the same value indicate that no new progress codes have been written to nonvolatile RAM 310.

Figure 4:
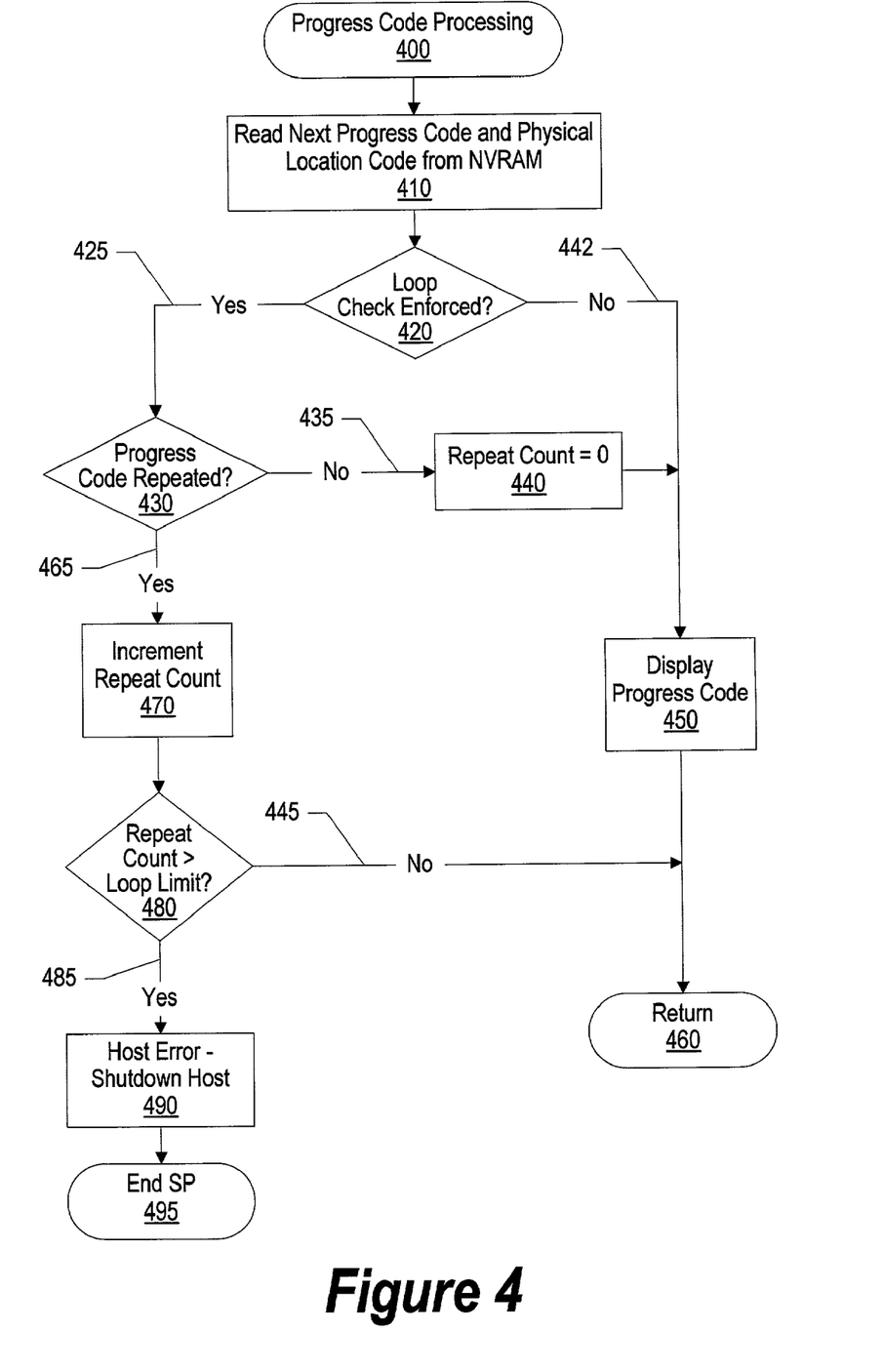
FIG. 4 is a flowchart of the service processor's handling of the progress codes.

If the pointers have different values, decision 378 branches to "no" branch 380 whereupon the newly received progress code is handled (predefined process 382, see FIG. 4 for processing details). The service processor pointer is incremented to match the last host pointer that was processed (step 384) and the new service processor pointer value is stored (step 386) in nonvolatile RAM 310. Processing then loops back to determine whether host initialization is finished (decision 362). If not then Service Processor continues processing additional progress codes.

If the pointers have the same value, decision 378 branches to "yes" branch 388 whereupon a determination is made as to whether the timer (set in step 370) has expired (decision 390). If the timer has not expired, decision 390 branches to "no" branch 392 which loops back to re-check the pointers and compare the values. This looping continues until either the pointers are no longer the same (in which case decision 378 branches to "no" branch 380), or the timer expires. If the timer expires, decision 390 branches to "yes" branch 394 whereupon the host error is handled (step 396, e.g., the host is rebooted, shutdown, etc.) and service processing ends at 398.

FIG. 4 is a flowchart of the service processor's handling of the progress codes. Processing commences at 400 whereupon the progress code and physical location code that was detected as being written to the nonvolatile RAM are read (step 410).

A determination is made as to whether loop checking is being enforced (decision 420). Loop checking is used to determine if the host is stuck in an endless loop whereby the same progress code (or same progress code qualified by the same physical location code) keep being written by the host to the nonvolatile RAM. If loop checking is being enforced, decision 420 branches to "yes" branch 425 whereupon a determination is made as to whether the last progress code (or progress code qualified by the physical location code) has been repeated (decision 430). If the code(s) have not been repeated, decision 430 branches to "no" branch 435 whereupon the repeat_count variable is set to zero (step 440), the progress code and physical location code data are displayed on the computer system's operator display panel (step 450, see FIG. 1 for an example of a computer system's operator display panel), and processing returns at 460.

On the other hand, if the code(s) have been repeated, decision 430 branches to "yes" branch 465 whereupon the repeat_count variable is incremented (step 470). A determination is made as to whether the incremented repeat count variable is greater than the established loop limit (decision 480).

If the repeat_count variable is not greater than the loop limit, decision 480 branches to "no" branch 445 and processing returns at 460. On the other hand, if the repeat_count variable is greater than the loop limit, decision 480 branches to "yes" branch 485 indicating that the host is stuck in an infinite loop condition. The host error is handled (step 490, e.g., the host is rebooted, shutdown, etc.) and service processing ends at 495.

Figure 5:
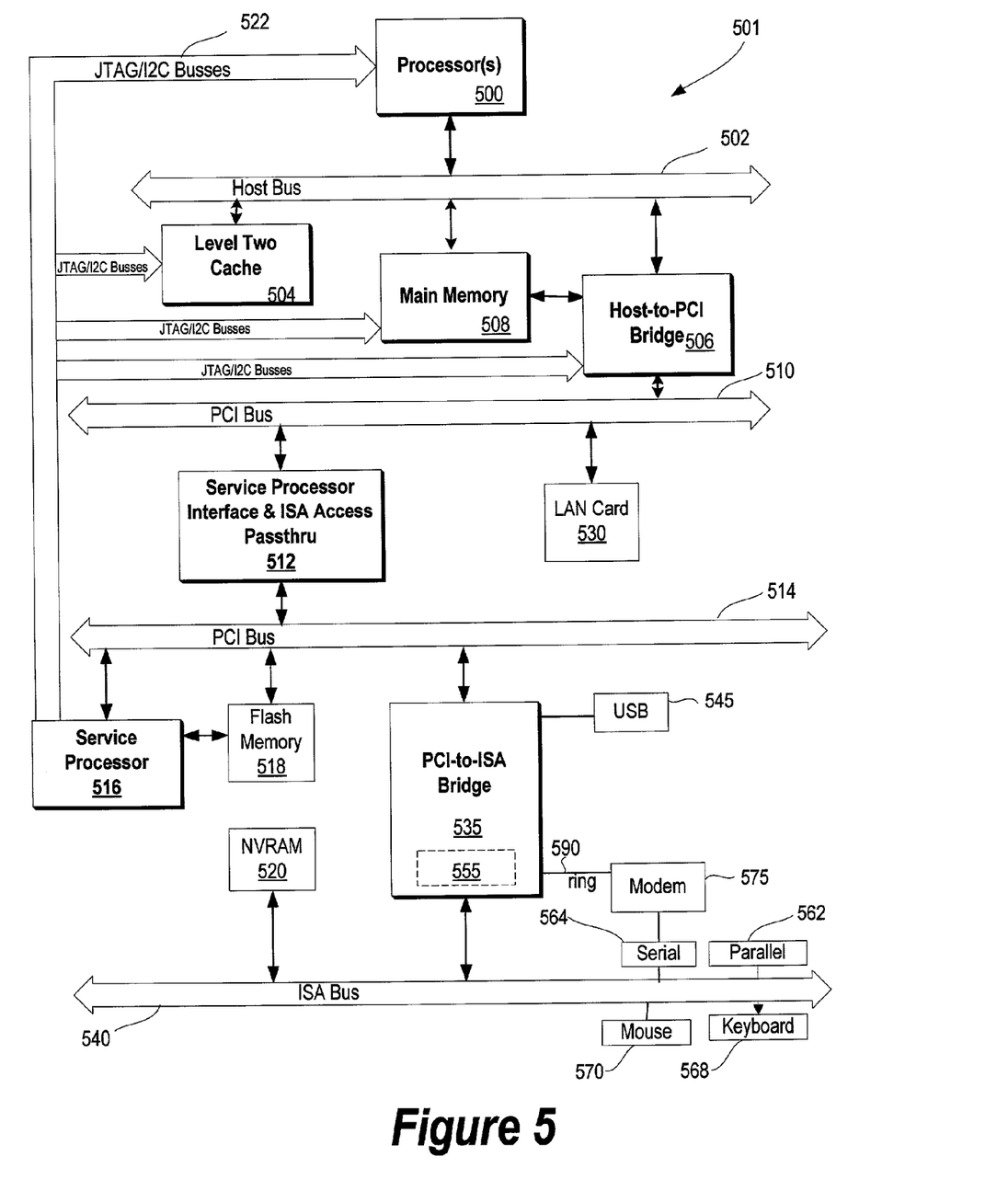
FIG. 5 is a block diagram of an information handling system capable of implementing the present invention.

FIG. 5 illustrates information handling system 501 which is a simplified example of a computer system capable of performing the computing operations described herein. Computer system 501 includes processor 500 which is coupled to host bus 502. A level two (L2) cache memory 504 is also coupled to host bus 502. Host-to-PCI bridge 506 is coupled to main memory 508, includes cache memory and main memory control functions, and provides bus control to handle transfers among PCI bus 510, processor 500, L2 cache 504, main memory 508, and host bus 502. Main memory 508 is coupled to Host-to-PCI bridge 506 as well as host bus 502. Devices used solely by host processor(s) 500, such as LAN card 530, are coupled to PCI bus 510. Service Processor Interface and ISA Access Pass-through 512 provides an interface between PCI bus 510 and PCI bus 514. In this manner, PCI bus 514 is insulated from PCI bus 510. Devices, such as flash memory 518, are coupled to PCI bus 514. In one implementation, flash memory 518 includes BIOS code that incorporates the necessary processor executable code for a variety of low-level system functions and system boot functions.

PCI bus 514 provides an interface for a variety of devices that are shared by host processor(s) 500 and Service Processor 516 including, for example, flash memory 518. PCI-to-ISA bridge 535 provides bus control to handle transfers between PCI bus 514 and ISA bus 540, universal serial bus (USB) functionality 545, power management functionality 555, and can include other functional elements not shown, such as a real-time clock (RTC), DMA control, interrupt support, and system management bus support. Nonvolatile RAM 520 is attached to ISA Bus 540 for the host to write progress codes during initialization and for Service Processor 516 to read the progress codes and determine whether an initialization error has occurred. Service Processor 516 includes JTAG and I2C busses 522 for communication with processor(s) 500 during initialization steps. JTAG/I2C busses 522 are also coupled to L2 cache 504, Host-to-PCI bridge 506, and main memory 508 providing a communications path between the processor, the Service Processor, the L2 cache, the Host-to-PCI bridge, and the main memory. This communication can include forcing a power-on-reset in the event of an initialization error. Service Processor 516 also has access to system power resources for powering down information handling device 501.

Peripheral devices and input/output (I/O) devices can be attached to various interfaces (e.g., parallel interface 562, serial interface 564, keyboard interface 568, and mouse interface 570 coupled to ISA bus 540. Alternatively, many I/O devices can be accommodated by a super I/O controller (not shown) attached to ISA bus 540.

In order to attach computer system 501 to another computer system to copy files over a network, LAN card 530 is coupled to PCI bus 510. Similarly, to connect computer system 501 to an ISP to connect to the Internet using a telephone line connection, modem 575 is connected to serial port 564 and PCI-to-ISA Bridge 535.

While the computer system described in FIG. 5 is capable of executing the invention described herein, this computer system is simply one example of a computer system. Those skilled in the art will appreciate that many other computer system designs are capable of performing the invention described herein.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for monitoring host computer initialization, said method comprising:
   initializing a timer within a service processor;
   reading a shared storage area from the service processor, wherein the shared storage area is accessible by a host computer and the service processor;
   determining whether updated progress data is included in the shared storage area based on the reading, the determining including:
      reading a host pointer from the shared storage area, the host pointer corresponding to a location in the stored storage area last used to write progress data by the host; and
      comparing the host pointer with a service processor pointer, the service processor pointer corresponding to a second location in the storage area last used to retrieve progress data from the shared storage area by the service processor; and
   performing host error processing by the service processor in response to determining that no updated progress data is included in the shared storage area and that the timer has expired.

2. The method as described in claim 1 wherein the shared storage area is selected from the group consisting of a shared nonvolatile random memory access area, a shared nonvolatile storage area, and a shared random access memory area.

3. The method as described in claim 1 further comprising:
reading the updated progress data in response to determining that the updated progress data is included in the shared storage area; and
displaying the updated progress data on a display device.

4. The method as described in claim 3 further comprising:
comparing the updated progress data to previously read progress data;
incrementing a repeat counter in response to the determining that the updated progress data is the same as the previously read progress data; and
performing host error processing by the service processor in response to determining that the incremented repeat counter exceeds a loop limit.

5. The method as described in claim 1 wherein the progress data includes a progress code and a physical location code.

6. The method as described in claim 1 wherein the shared storage area includes:
a buffer area used to store progress data; and
a header area, the header area including:
the host pointer;
the service processor pointer; and
a buffer length indicating the length of the buffer area.

7. An information handling system comprising:
one or more host processors;
a service processor;
a shared memory accessible by the host processors and the service processor;
an surveillance tool for monitoring initialization of the information handling system, the surveillance tool including:
means for initializing a timer within the service processor;
means for reading the shared memory from the service processor, wherein the shared memory is accessible by a host computer and the service processor;
means for determining whether updated progress data is included in the shared memory based on the reading, the means for determining including:
means for reading a host pointer from the shared storage area, the host pointer corresponding to a location in the stored storage area last used to write progress data by the host; and
means for comparing the host pointer with a service processor pointer, the service processor pointer corresponding to a second location in the storage area last used to retrieve progress data from the shared storage area by the service processor; and
means for performing host error processing by the service processor in response to determining that no updated progress data is included in the shared memory and that the timer has expired.

8. The information handling system as described in claim 7 wherein the shared memory is selected from the group consisting of a shared nonvolatile random memory access area, a shared nonvolatile storage area, and a shared random access memory area.

9. The information handling system as described in claim 7 further comprising:
means for reading the updated progress data in response to determining that the updated progress data is included in the shared memory; and
means for displaying the updated progress data on a display device.

10. The information handling system as described in claim 9 further comprising:
means for comparing the updated progress data to previously read progress data;
means for incrementing a repeat counter in response to the determining that the updated progress data is the same as the previously read progress data; and
means for performing host error processing by the service processor in response to determining that the incremented repeat counter exceeds a loop limit.

11. The information handling system as described in claim 7 wherein the progress data includes a progress code and a physical location code.

12. The information handling system as described in claim 7 wherein the shared memory includes:
a buffer area used to store progress data; and
a header area, the header area including:
the host pointer;
the service processor pointer; and
a buffer length indicating the length of the buffer area.

13. A computer program product stored in a computer operable media for executing computer readable instructions that monitor host computer initialization, said computer program product comprising:
means for initializing a timer within a service processor;
means for reading a shared storage area from the service processor, wherein the shared storage area is accessible by a host computer and the service processor;
means for determining whether updated progress data is included in the shared storage area based on the reading, the means for determining including:
means for reading a host pointer from the shared storage area, the host pointer corresponding to a location in the stored storage area last used to write progress data by the host; and
means for comparing the host pointer with a service processor pointer, the service processor pointer corresponding to a second location in the storage area last used to retrieve progress data from the shared storage area by the service processor; and
means for performing host error processing by the service processor in response to determining that no updated progress data is included in the shared storage area and that the timer has expired.

14. The computer program product as described in claim 13 wherein the shared storage area is selected from the group consisting of a shared nonvolatile random memory access area, a shared nonvolatile storage area, and a shared random access memory area.

15. The computer program product as described in claim 13 further comprising:
means for reading the updated progress data in response to determining that the updated progress data is included in the shared storage area; and
means for displaying the updated progress data on a display device.

16. The computer program product as described in claim 15 further comprising:
means for comparing the updated progress data to previously read progress data;
means for incrementing a repeat counter in response to the determining that the updated progress data is the same as the previously read progress data; and means for performing host error processing by the service processor in response to determining that the incremented repeat counter exceeds a loop limit.

17. The computer program product as described in claim 13 wherein the shared storage area includes:
a buffer area used to store progress data; and
a header area, the header area including:
the host pointer;
the service processor pointer; and
a buffer length indicating the length of the buffer area.

* * * * *